United States Patent
Abdolhosseini et al.

(10) Patent No.: US 7,294,178 B2
(45) Date of Patent: Nov. 13, 2007

(54) LOW LOSS HYDROCARBON (HC) ADSORBER DEVICE FOR AIR INDUCTION SYSTEM

(75) Inventors: Reza Abdolhosseini, West Bloomfield, MI (US); Jeffry M. Leffel, Wixom, MI (US); Sirukudi V. Janakiraman, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 290 days.

(21) Appl. No.: 10/983,532

(22) Filed: Nov. 8, 2004

(65) Prior Publication Data

US 2006/0096458 A1 May 11, 2006

(51) Int. Cl.
*B01D 53/02* (2006.01)
(52) U.S. Cl. .......................................... 96/108; 55/492
(58) Field of Classification Search ..................... 95/90, 95/143; 96/108; 55/385.3, 490, 491, 492, 55/508; 123/198 E
See application file for complete search history.

(56) References Cited

U.S. PATENT DOCUMENTS

| | | | |
|---|---|---|---|
| 3,456,635 A | 7/1969 | Hervert | |
| 3,477,210 A | 11/1969 | Hervert | |
| 4,093,435 A * | 6/1978 | Marron et al. | 96/125 |
| 4,235,608 A * | 11/1980 | Watanabe et al. | 96/118 |
| 4,720,292 A | 1/1988 | Engel et al. | |
| 5,125,940 A | 6/1992 | Stanhope et al. | |
| 5,350,444 A | 9/1994 | Gould et al. | |
| 5,512,083 A * | 4/1996 | Dunne | 95/113 |
| 5,733,451 A * | 3/1998 | Coellner et al. | 210/496 |
| 6,190,432 B1 | 2/2001 | Gieseke et al. | |
| 6,432,179 B1 | 8/2002 | Lobovsky et al. | |
| 6,464,761 B1 | 10/2002 | Bugli | |
| 6,527,837 B2 * | 3/2003 | Kurosawa et al. | 96/125 |
| 6,610,117 B2 | 8/2003 | Gieseke et al. | |
| 6,638,330 B1 | 10/2003 | Bergami | |
| 6,736,871 B1 | 5/2004 | Green et al. | |
| 6,758,885 B2 | 7/2004 | Leffel et al. | |
| 2002/0029693 A1 * | 3/2002 | Sakakibara et al. | 96/134 |
| 2002/0043156 A1 | 4/2002 | Shea | |
| 2002/0069625 A1 | 6/2002 | Stass | |
| 2003/0066427 A1 | 4/2003 | Ishida | |
| 2003/0182909 A1 | 10/2003 | Gieseke et al. | |
| 2004/0112219 A1 | 6/2004 | Leffel et al. | |
| 2004/0139708 A1 | 7/2004 | Giacinto | |
| 2006/0042467 A1 * | 3/2006 | Maru | 96/134 |
| 2006/0150811 A1 * | 7/2006 | Callahan et al. | 95/146 |

FOREIGN PATENT DOCUMENTS

JP          56-032072 A  *  4/1981

* cited by examiner

*Primary Examiner*—Frank M. Lawrence
(74) *Attorney, Agent, or Firm*—Brinks Hofer Gilson & Lione

(57) ABSTRACT

A hydrocarbon trapping device including an adsorbing element of a material configured to adsorb hydrocarbons from the air and a support connected to the adsorbing element is provided. The adsorbing element includes first and second opposing ends, and the support includes an embedded portion located within the adsorbing element between the first and second ends to reinforce the adsorbing element.

28 Claims, 3 Drawing Sheets

LOW LOSS HYDROCARBON (HC) ADSORBER DEVICE FOR AIR INDUCTION SYSTEM

BACKGROUND

1. Field of Invention

The present invention relates generally to an air intake system and more particularly to a hydrocarbon trap for adsorbing hydrocarbons in the air intake system.

2. Related Technology

Due to laws requiring the reduction of the levels of hydrocarbons that vehicles may emit into the atmosphere, it is necessary for automotive designers to include systems in vehicles to control emissions. Hydrocarbons are released in a vehicle's exhaust, as well as from the engine, even when it is not operating. Hydrocarbons remaining from engine reactions can leak out of the engine through the engine's air intake system. It is therefore beneficial to reduce the level of hydrocarbons released from both the exhaust and the engine via the air intake system.

One device for retaining hydrocarbons from the air released through the engine's intake is a filter-like device having a hydrocarbon trapping element. Typically, the hydrocarbon trapping device is formed of monolith carbon that is disposed in the air induction system of a motor vehicle. More specifically, the hydrocarbon trapping device is typically located in an air intake conduit that provides air to the engine for combustion. Therefore, when the engine is operating and air is flowing through the conduit towards the engine, the hydrocarbon trapping device is considered to be upstream from the engine.

The hydrocarbon trapping device operates by adsorbing hydrocarbons from the low velocity flow that occurs while the engine is not in operation. When the engine is not in operation air leaks out of the air intake system and into the atmosphere. During engine operation, high velocity flow through the air intake system purges the device of trapped hydrocarbons and flushes the hydrocarbons into the vehicle engine.

One problem arising with the hydrocarbon trapping device, however, is that the adsorbing element can become saturated with hydrocarbons; substantially reducing or ceasing adsorption of hydrocarbons. Therefore, in order to effectively trap hydrocarbons and to substantially prevent saturation of the device, it is advantageous to increase the adsorption capacity of the hydrocarbon trapping device.

Another problem associated with hydrocarbon trapping devices is that the devices may act as an obstruction to the air flowing to the engine, thus causing a pressure drop in the airflow to the engine. Therefore, in order to substantially reduce or prevent a drop in air pressure across the hydrocarbon trapping device, it is advantageous to increase the amount of air that can flow through the device.

Yet another problem associated with hydrocarbon trapping devices is that the devices may not have the strength to sustain structural integrity during operation. This problem is especially evident in cases where the device includes a large cross-sectional area—such as a cross-sectional area designed to permit a large volume of air to flow therethrough.

Therefore, it is highly desirable to have a hydrocarbon trapping device that is able to adsorb a relatively large amount of hydrocarbons without becoming saturated, while substantially preventing large airflow pressure drops and maintaining a sufficient structural strength throughout the life of the device.

SUMMARY

A hydrocarbon trapping device embodying the principles of the present invention that includes an adsorbing element having a material configured to adsorb hydrocarbons from the air intake system, and further includes a support connected to the adsorbing element to provide structural support for the adsorbing element. The support includes an embedded portion located within the adsorbing element between first and second ends thereof. The support increases the strength of the adsorbing element and allows the adsorbing element to be constructed with a larger cross-sectional area. More specifically, the cross-sectional area of the adsorbing element can be increased by 100% or more while maintaining an effective strength.

In one aspect of the invention, the support and the adsorbing element cooperate to form a press-fit engagement extending substantially along the entire length of the embedded portion. A pliable material, such as a fibrous mat, is located between the adsorbing element and the support to aid in forming the press-fit engagement. The embedded portion is preferably located within a central region of the adsorbing element. More preferably, it is located completely within the central region. In an alternative embodiment, the embedded portion extends from a central region of the adsorbing element to an outer surface of the adsorbing element.

The support may include an end or ends that extend beyond the first and second ends of the adsorbing element. For aerodynamic purposes, the ends of the support include rounded outer surfaces.

The hydrocarbon trapping device may also include a radially oriented strut having a first end engaging the support and a second end engaging the conduit of the air intake system.

Accordingly, an air intake system of an engine can also be providing so as to include: a conduit, an adsorbing element located within the conduit, and a support connected to the adsorbing element. The adsorbing element adsorbs hydrocarbons present in the air intake system, and the support includes an embedded portion located within the adsorbing element between the first and second ends.

In one embodiment, the conduit of the air intake system preferably includes a first portion having a first diameter and a second portion having a second, larger diameter, with the adsorbing element being located within the second portion. The dimensions of the first portion and the second portion are such that the potential airflow through the unobstructed first portion is substantially equal to the potential airflow through the second section, which will be partially obstructed by the adsorbing element.

Further objects, features and advantages of this invention will become readily apparent to persons skilled in the art after a review of the following description, with reference to the drawings and claims that are appended to and form a part of this specification.

DETAILED DESCRIPTION

Figure 2:
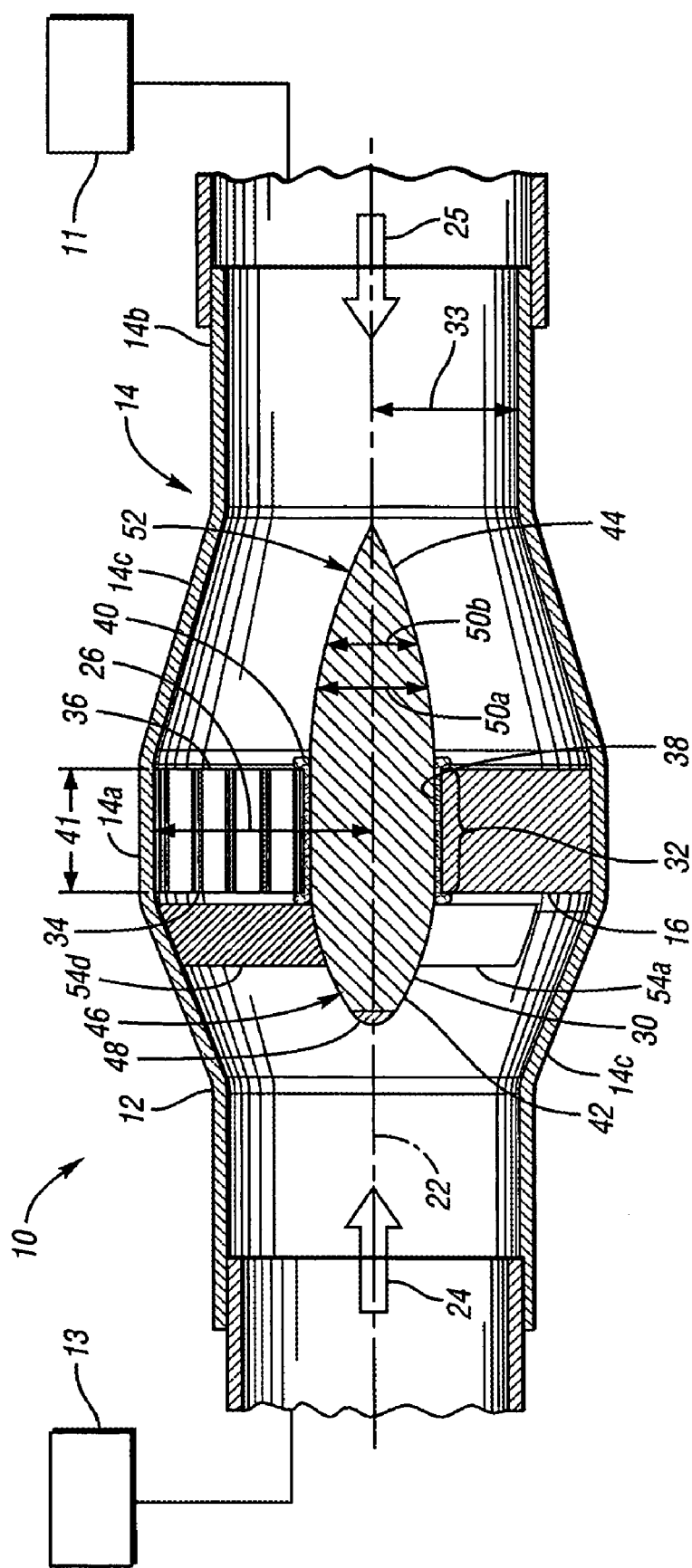
FIG. 2 is a cross-sectional view, generally taken along line 2-2, of the air intake system in FIG. 1.

Referring now to the drawings, FIG. 2 shows a portion of an air intake system 10 for an engine 11, shown in block form, of a motor vehicle (not shown). The air intake system 10 is located between an air intake inlet 13 and the engine 11 such that a conduit of the air intake system 10 supplies ambient air via the inlet 13 to the engine 11. The air intake system 10 includes a conduit 12 for supplying air to the engine 11, and a hydrocarbon trap device 14. Positioned within the conduit 12 as such, the hydrocarbon trap device 14 removes hydrocarbons from the air passing through the conduit 12, particularly when the engine is not running.

The hydrocarbon trap device 14 is preferably located between an inlet 13 of the air intake system 10 and the engine 11 of the motor vehicle. Therefore, while the engine 11 is operating under normal conditions and air is being drawn towards the engine 11 in a high velocity airflow direction 24, the hydrocarbon trap device 14 is upstream from the engine 11. In this situation, when the high velocity airflow is directed towards the engine 11, any hydrocarbons in the air intake system are forced towards the engine 11 where they become combusted.

However, when the engine 11 is not in operation, air is permitted to seep out of the inlet 13 of the air intake system 10 and into the atmosphere. Air seeping out of the engine 11 typically contains hydrocarbons, which the hydrocarbon trap device 14 substantially captures as discussed below, preventing the hydrocarbons from escaping to the ambient air. Once the engine 11 is operating again, the hydrocarbons are purged from the hydrocarbon trap device 14 by the relatively high-velocity airflow flowing towards the engine 11, where they become combusted.

Figure 1:
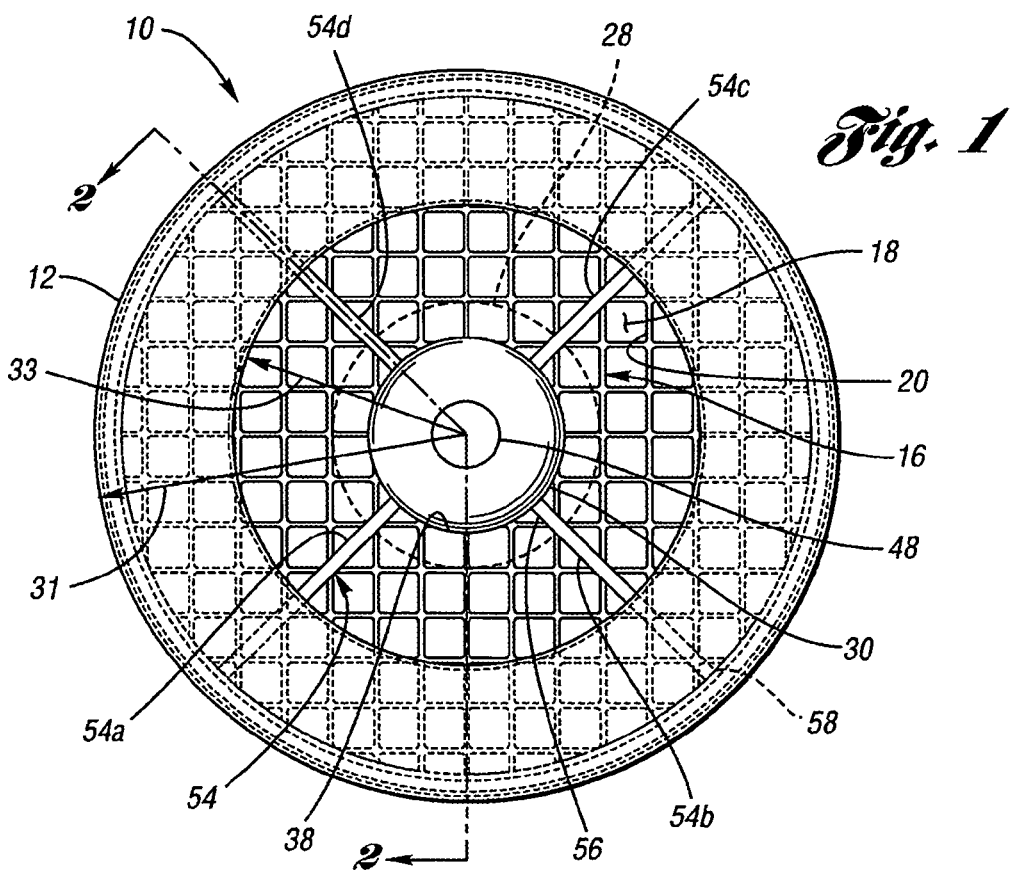
FIG. 1 is an end view of an air intake system in accordance with the teachings of the present invention, the air intake system having a conduit receiving a hydrocarbon trapping device.

As one of its main components, the hydrocarbon trap device 14 includes a hydrocarbon adsorbing element, such as the monolith 16 shown in FIGS. 1-2. The monolith 16 is a generally cylindrical-shaped carbon element having a plurality of channels 18 defined therein. The channels 18 are aligned such as to be generally parallel with a central axis 22 of the conduit 12 and to be generally parallel with the high velocity airflow direction 24. This configuration, where the channels 18 are generally parallel with the high velocity airflow direction 24, minimizes the pressure drop that the airflow undergoes as it flows through the monolith 16 at a high velocity, thus maximizing the air flow to the engine 11.

Walls 20 of the monolith 16 define the channels 18, which are shown having a generally rectangular cross-section. While shown with a rectangular cross-section, any appropriate configuration such as a circular cross-section, may be used as the shape of the channels 18.

In order to substantially prevent the hydrocarbon trap device 14 from becoming saturated with hydrocarbons, it is preferred that the monolith walls 20 define as large a surface area as possible. One means for increasing the surface area volume is to provide a monolith with a relatively large cross-sectional diameter 26, as shown in FIG. 2. The large cross-sectional diameter 26 is particularly advantageous because it permits a relatively large amount of air to flow therethrough. Furthermore, an increased cross-sectional diameter 26 allows the length of the monolith 16, along the longitudinal axis 22, to be reduced, thereby reducing the length along which the air flow is constricted as it passes through the monolith 16.

However, the increased cross-sectional diameter 26 and the reduced length may cause decreased strength within the monolith 16, especially in a central region 28 of the monolith 16. As used herein, the central region 28 is defined as the portion of the monolith 16 located in the area adjacent to the longitudinal axis 22. More specifically, the arcuate line defining the central region 28 shown in FIG. 1 preferably has a diameter that is one-half or less in size than the diameter of the monolith 16.

The conduit 12 includes a portion having a diameter large enough to receive the hydrocarbon trap device 14. Therefore, the conduit 12 in FIGS. 1-2 includes an increased diameter portion 14a having a first diameter 31, and decreased diameter portions 14b having a second diameter 33 that is smaller than the first diameter 31. The conduit 12 also includes sloping portions 14c that gradually slope between the respective increased and decreased diameter portions 14a, 14b in order to promote a smooth airflow through the respective portions 14a, 14b, 14c. The conduit 12 is preferably a unitary, one-piece tube in order to minimize airflow turbulence. However, a multi-piece tube may alternatively be used to potentially simplify the manufacturing process.

In order to improve the strength of the monolith 16, a support 30 is preferably provided within the monolith 16. More specifically, the support 30 shown in FIGS. 1-2 includes an embedded portion 32 located within the monolith 16 and extending between a front face 34 and a rear face 36 of the monolith 16 (shown in FIG. 2). The embedded portion 32 is located in the central region 28 (shown in FIG. 1), in order to most effectively provide support for the hydrocarbon trap device 14 and may be formed from plastic or any other suitable material.

The support 30 preferably is mounted within an opening 38, defined by the monolith walls 20, in a press-fit connection. Therefore, the opening 38 is shaped to compliment the support 30. Furthermore, a pliable intermediate member, such as a cushion 40, is located between the opening 38 and the support 30 in order to protect the respective components 30, 38 during assembly and to more effectively seal the components 30, 38 with each other. The cushion 40 may be formed from any appropriate material, such as a fibrous mat. Additionally, a mechanical fastener or an adhesive may be provided between the support 30, the cushion 40, and the opening 38 in order to more effectively secure the components 30, 38, 40 together.

As seen in FIG. 2, the support 30 extends completely through the length 41 of the monolith 16 such that a front end 42 extends from the front face 34, and a rear end 44 extends from the rear face 36. The front end 42 has an aerodynamic surface in order to smoothly deviate air in a radial direction towards the monolith 16, thus minimizing turbulence in the air flowing into the hydrocarbon trap device 14. More specifically, the front end 42 includes a generally rounded outer surface 46 and a generally rounded nose section 48. The nose section 48 may be a unitary portion of the front end 42, or it may be a separate piece that is integrally formed with the front end 42.

The rear end 44 is similarly provided within an aerodynamic surface to smoothly transition the air towards the central portion of the conduit 12, thus minimizing turbulence in the air flowing out of the hydrocarbon trap device 14. The rear end 44 preferably has a diameter 50a, 50b that decreases as it extends away from the monolith 16. More preferably, the rear end 44 includes a generally cone-shaped outer surface 52.

In order to securely position the support 30, a support member is preferably provided, such as a strut 54a having a first end 56 engaging the support 30 and a second end 58 engaging the conduit 12. More preferably, a plurality of struts 54a, 54b, 54c, 54d are provided to secure the support 30 at various points around its circumference. Similarly to the support 30, the struts 54a, 54b, 54c, 54d shown in FIGS. 1-2 include an aerodynamic outer surface to minimize turbulence flowing into the hydrocarbon trap device 14. The struts 54a, 54b, 54c, 54d each have a generally teardrop-shaped cross-sectional profile. The struts 54a, 54b, 54c, 54d may be formed of the same material as the support 30.

As shown in FIGS. 1-2, the struts 54a, 54b, 54c, 54d are spaced apart from the monolith 16 along the longitudinal axis 22 in order to avoid obstructing the monolith channels 18. In order to more effectively position the support for the support 30, the struts 54a, 54b, 54c, 54d are secured to either or both of the support 30 and the conduit 12 by securing means, such as fasteners or adhesives. Alternatively, the struts 54a, 54b, 54c, 54d are press-fit between the support 30 and the conduit 12, without the aid of any additional securing means.

A process by which the air intake system 10 shown in FIGS. 1-2 is manufactured will now be discussed. The conduit 12 may be a unitary, one-piece tube formed by any appropriate means. For example, the tube may be formed by: selectively enlarging a constant-diameter tube section in order to form the sloping portions 14c and increased diameter portion 14a; selectively decreasing a constant-diameter tube section in order to form the sloping portions 14c and decreased diameter portion 14b; molding a material into a tube having the respective portions 14a, 14b, 14c; or a combination thereof. The tube portions may be reduced or enlarged by any appropriate means, such as swaging or blow molding.

Alternatively, the conduit 12 may include multiple sections that are individually formed, and then integrally connected with each other. The sections may be connected by any appropriate means, such as welding or adhering the sections together.

The hydrocarbon trap device 14 shown in FIGS. 1-2 is preferably manufactured by removing material from the central region 28 of the monolith 16 in order to form the opening 38. The step of removing material may be done by any appropriate means, such as machining the monolith 16. Alternatively, the monolith 16 may be initially formed having an opening 38, such as by molding or extruding.

The support 30 shown in FIGS. 1-2 is preferably manufactured by forming a plastic component into the desired shape by any appropriate means, such as molding or machining. As discussed above, the nose section 48 may be a unitary component of the support 30, or it may be a separate piece that is integrally connected to the support 30. The struts 54a, 54b, 54c, 54d may also be a unitary component of the support 30, or they may be a separate piece that is positioned to engage the support or to be integrally connected to the support 30.

Next, the cushion 40 is wrapped around the embedded portion 32 of the support 30, and the support 30 and the struts 54a, 54b, 54c, 54d are preferably press-fit into the opening 38. As discussed above, a securing means, such as a fastener or an adhesive may be used to secure the respective components 16, 30, 54a, 54b, 54c, 54d together.

Figure 3:
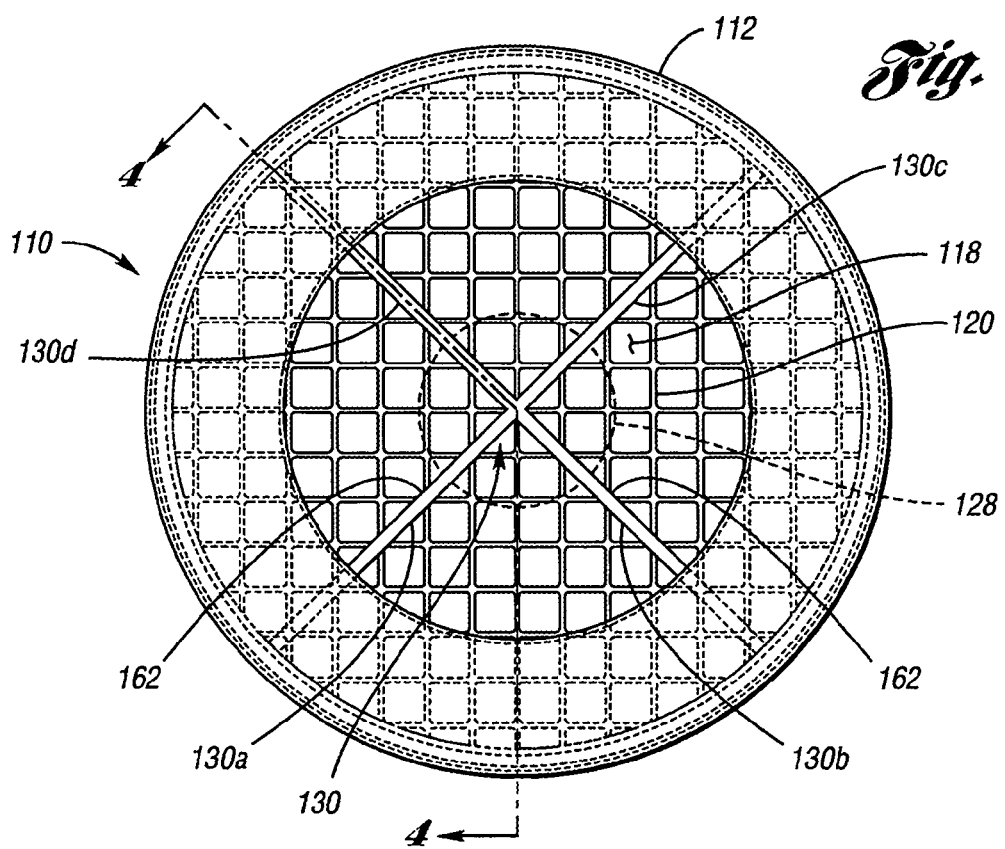
FIG. 3 is an end view of an alternative embodiment of an air intake system in accordance with the teachings of the present invention.
Figure 4:
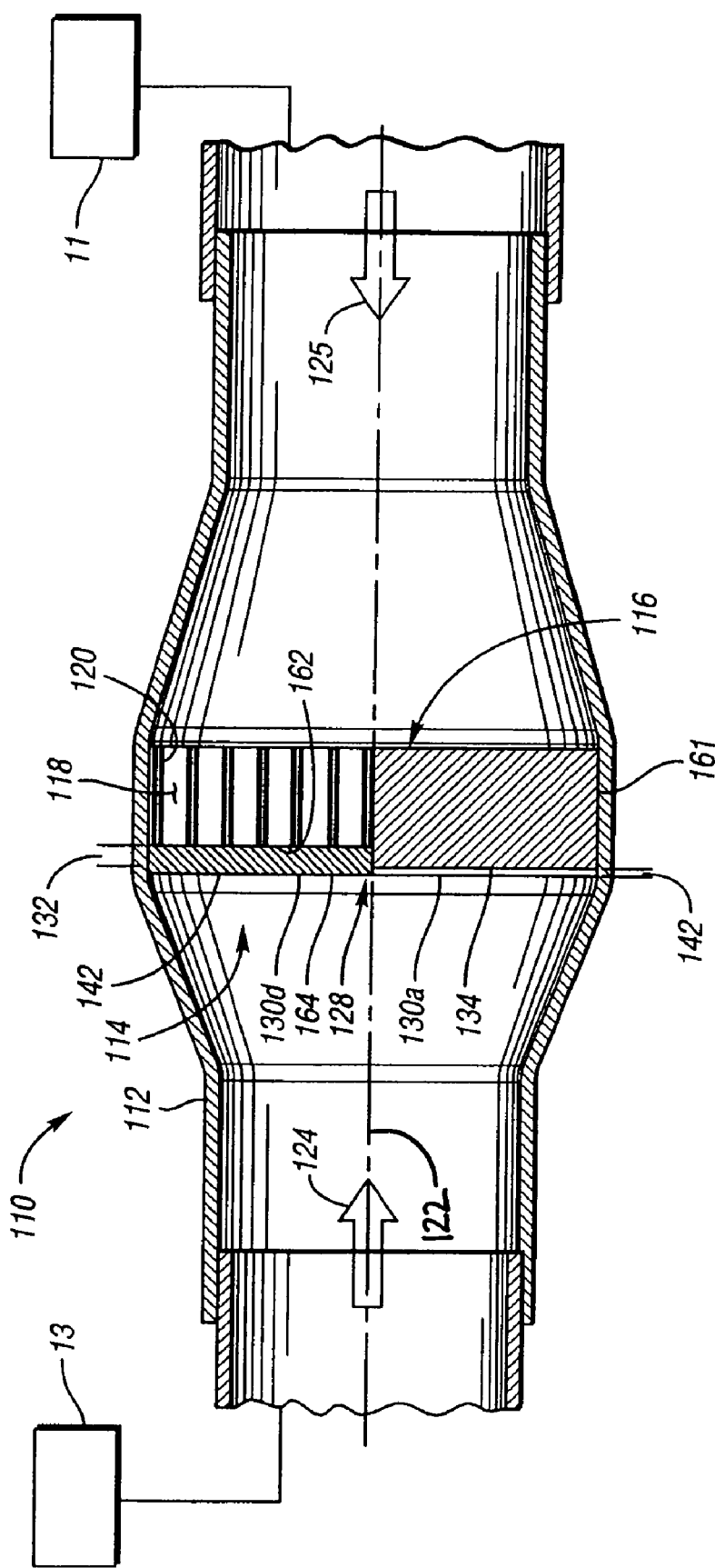
FIG. 4 is a cross-sectional view taken along line 4-4, of the air intake system in FIG. 3.

Referring now to FIGS. 3 and 4, an alternative embodiment of an air intake system 110 embodying the principles of the present invention will now be discussed. A hydrocarbon trap device 114, having a monolith 116, is received within a conduit 112 having a longitudinal axis 122, similarly with the embodiment described with respect to FIGS. 1-2. Additionally, the monolith 116 includes a plurality of channels 118 defined by monolith walls 120 in order to receive airflow. As the air flows from the engine 11 in a low velocity airflow direction 125, the hydrocarbon trap device 114 traps pollutants within, thereby removing them from the air. As the air flows towards the engine 11 at a high velocity airflow direction 124, the hydrocarbon trap device 114 is purged of pollutants.

The air intake system 110 shown in FIGS. 3 and 4 also includes a support 130 at least partially embedded within the monolith 116 in order to strengthen the hydrocarbon trap device 114. The support 130 preferably includes a plurality of arm portions 130a, 130b, 130c, 130d extending generally from a central region 128 of the monolith 116 to an outer surface 161 of the monolith 116. The central region 128 is defined as the portion of the monolith 116 located a relatively short distance from the longitudinal axis 122 along a line generally perpendicular thereto, as shown in FIG. 3. More specifically, the arcuate line defining the central region 128 in FIG. 3 preferably has a diameter that is one-half or less the size of the diameter of the monolith 116. The outer surface 161 is defined as the portion of the monolith 116 engaged with the conduit 112. Each of the arm portions 130a, 130b, 130c, 130d preferably includes an embedded portion 132 embedded within the monolith 116, thereby increasing its strength. The embedded portion 132 is secured within a guide channel 162 by an appropriate process, such as a press-fit connection of a securing means.

Each of the arm portions 130a, 130b, 130c, 130d also preferably includes an end 142 extending from a front face 134 of the monolith 116. The end 142 preferably includes an aerodynamic outer surface, such as a rounded nose portion 164.

Alternative embodiments other than those described above may be used with the present invention. For example, the hydrocarbon trap may be positioned downstream from the operating engine 11 such as to filter pollutants from the engine exhaust. Additionally, the adsorbing element may be formed from an alternative material than described above. It is therefore intended that the foregoing detailed description be regarded as illustrative rather than limiting, and that it be understood that it is the following claims, including all equivalents, that are intended to define the spirit and scope of this invention.

What is claimed is:

1. A hydrocarbon trapping device comprising:
    an adsorbing element of a hydrocarbon adsorbing material, the adsorbing element having opposed first and second ends and a plurality of channels extending between the first and second ends;
    a support connected to the adsorbing element, the support having an embedded portion located within the adsorbing element between the first and second ends; whereby the support provides reinforcement for the hydrocarbon adsorbing material; and
    a pliable material located between the adsorbing element and the embedded portion of the support.

2. A hydrocarbon trapping device as in claim 1, wherein the pliable material is a fibrous mat.

3. A hydrocarbon trapping device comprising:
an adsorbing element of a hydrocarbon adsorbing material, the adsorbing element having opposed first and second ends and a plurality of channels extending between the first and second ends;
a support connected to the adsorbing element, the support having an embedded portion located within the adsorbing element between the first and second ends; whereby the support provides reinforcement for the hydrocarbon adsorbing material;
wherein the support includes an end extending axially beyond one of the first and second ends of the adsorbing element, wherein the end of the support includes a tapered surface.

4. A hydrocarbon trapping device as in claim 3, the support and the adsorbing element are in press-fit engagement with one another, the engagement extending substantially along an entire length of the embedded portion.

5. A hydrocarbon trapping device as in claim 3, wherein the embedded portion is within a central region of the adsorbing element.

6. A hydrocarbon trapping device as in claim 3, wherein the embedded portion is completely within the central region of the adsorbing element.

7. A hydrocarbon trapping device as in claim 5, wherein the embedded portion extends from the central region of the adsorbing element to an outer surface of the adsorbing element.

8. A hydrocarbon trapping device as in claim 3, wherein the end of the support includes a rounded surface.

9. A hydrocarbon trapping device as in claim 3, further comprising a strut having a first end connected to the support and extending outward therefrom.

10. A hydrocarbon trapping device as in claim 9, wherein the strut extends radially outward from the support.

11. A hydrocarbon trapping device as in claim 10, the strut having a rounded surface.

12. A hydrocarbon trapping device as in claim 3, wherein the support includes a second end extending axially beyond the other of the first and second ends of the adsorbing element.

13. A hydrocarbon trapping device as in claim 12, wherein the first end of the support tapers in a decreasing diameter away from the first end of the adsorbing element.

14. A hydrocarbon trapping device as in claim 13, wherein the second end of the support tapers in a decreasing diameter away from the second end of the adsorbing element.

15. A hydrocarbon trapping device as in claim 3, further comprising a conduit in fluid connection with, and configured to deliver air to, an air intake system; the adsorbing element located within the conduit.

16. A hydrocarbon trapping device as in claim 15, the support and the adsorbing element are in press-fit engagement with one another, the engagement extending substantially along an entire length of the embedded portion.

17. A hydrocarbon trapping device as in claim 16, further comprising a pliable material located between the adsorbing element and the support.

18. A hydrocarbon trapping device as in claim 15, wherein the embedded portion is within a central region of the adsorbing element.

19. A hydrocarbon trapping device as in claim 18, wherein the embedded portion is completely within the central region of the adsorbing element.

20. A hydrocarbon trapping device as in claim 18, wherein the embedded portion extends from the central region of the adsorbing element to an outer surface of the adsorbing element.

21. A hydrocarbon trapping device as in claim 15, wherein the support includes an end extending axially beyond one of the first and second ends of the adsorbing element.

22. A hydrocarbon trapping device as in claim 21, wherein the end of the support includes a tapered surface.

23. A hydrocarbon trapping device as in claim 15, further comprising a strut having a first end connected to the support and a second end engaging the conduit.

24. A hydrocarbon trapping device as in claim 23, the strut having a rounded surface.

25. A hydrocarbon trapping device as in claim 21, wherein the support includes a second end extending axially beyond the other of the first and second ends of the adsorbing element.

26. A hydrocarbon trapping device as in claim 25, wherein the first end of the support tapers in a decreasing diameter away from the first end of the adsorbing element.

27. A hydrocarbon trapping device as in claim 26, wherein the second end of the support tapers in a decreasing diameter away from the second end of the adsorbing element.

28. A hydrocarbon trapping device for an air intake system, the hydrocarbon trapping device comprising:
a conduit comprising a single passageway in fluid connection with, and configured to deliver air to, the air intake system;
an adsorbing element located within the conduit, the adsorbing element including a hydrocarbon adsorbing material, the adsorbing element having opposed first and second ends and a plurality of channels extending between the first and second ends;
a support connected to the adsorbing element, the support having an embedded portion located within the adsorbing element between the first and second ends: whereby the support provides reinforcement for the hydrocarbon adsorbing material;
the conduit including a first portion having a first diameter and a second portion having a second diameter, wherein the second diameter is greater than the first diameter and the adsorbing element is located within the second portion of the conduit.

* * * * *

UNITED STATES PATENT AND TRADEMARK OFFICE
CERTIFICATE OF CORRECTION

PATENT NO. : 7,294,178 B2
APPLICATION NO. : 10/983532
DATED : November 13, 2007
INVENTOR(S) : Reza Abdolhosseini et al.

It is certified that error appears in the above-identified patent and that said Letters Patent is hereby corrected as shown below:

<u>In the Claims</u>

Column 8, in claim 28, line 13, immediately after "second ends" delete ":" (colon) and substitute --;-- (semicolon) in its place.

Signed and Sealed this

Twenty Second Day of April, 2008

JON W. DUDAS
*Director of the United States Patent and Trademark Office*